June 21, 1949. L. I. OSIPOW 2,474,113
ELECTRIC STEAMING STAND
Filed May 9, 1947
Fig. 1.
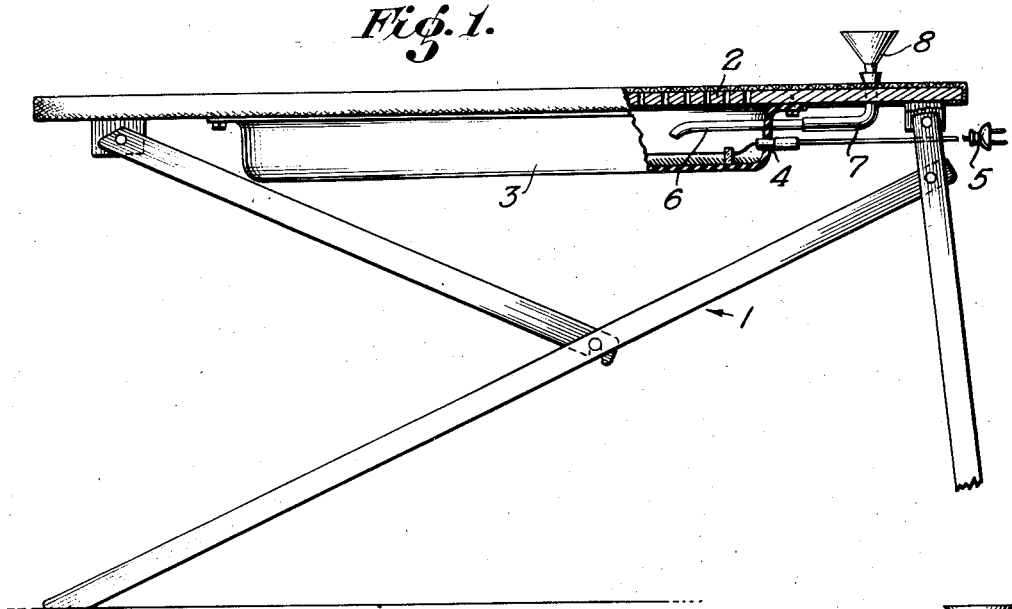
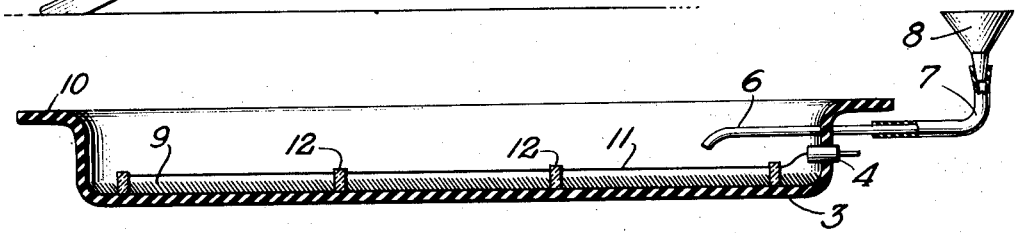
Fig. 2.
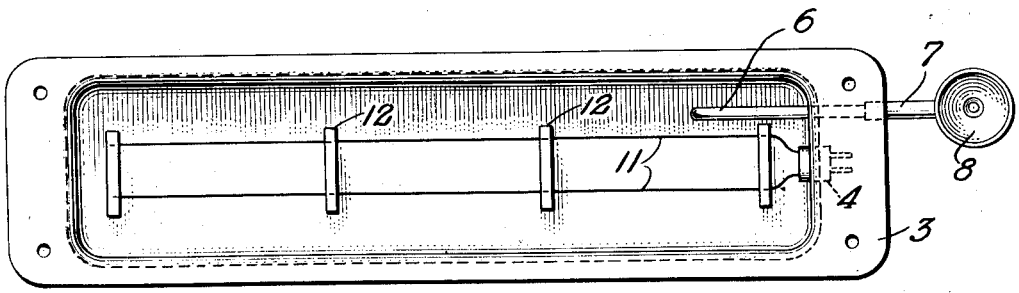
Fig. 3.
Inventor:
Lloyd I. Osipow Patented June 21, 1949

2,474,113

UNITED STATES PATENT OFFICE 2,474,113

ELECTRIC STEAMING STAND

Lloyd I. Osipow, Bronx, N. Y.

Application May 9, 1947, Serial No. 747,041

2 Claims. (Cl. 219—40)

1

The invention relates to a new and useful electric steaming device and has as its object a stand which can generate an optimum volume of steam over a comparatively large area.

The novel parts, constructions, arrangements, combinations, and improvements of my invention will be herein shown and described.

Objects and advantages obtained by this invention include the convenience it affords in the accomplishment of such household chores as the predampening of garments while ironing, the preshrinking of home sewn garments, and the raising of nap on velvet and velveteen. In addition, the invention may be used to maintain the temperature of heated food while serving.

Other objects and advantages of the invention will in part be obvious from the description and drawing hereinafter following, and in part may be learned by practice with the invention.

In the drawing:

Fig. 1 is a perspective view showing the electric steaming stand which constitutes my invention.

Fig. 2 is a side view on an enlarged scale, showing the electric steaming element, the water feed, and the containing vessel.

Fig. 3 is a top view on an enlarged scale, showing the electric steaming element and the electrode separators.

The stand, number 1 in Fig. 1, is an ironing board or serving table with a perforated top, number 2, to which is attached an electrically insulated vessel, number 3, containing the steaming element. Number 4 is a male electric plug attached to the vessel, number 3, which may be inserted into the female member of the electric cord assembly, number 5. A hollow tube, number 6, passes through a wall of the vessel and is connected by means of a rubber tube, number 7, to a funnel, number 8.

Fig. 2 is a side view of the steaming element showing the manner in which water may be poured into the vessel by means of the funnel, number 8. Number 9 is a mixture of a slightly soluble electrolyte and a binder. Number 10 is a flange providing a means by which the vessel may be attached to the stand, number 1 in Fig. 1.

Wire electrodes, numbers 11 in Fig. 3, are attached to the electric plug, number 4, and spaced

2 about two inches apart by means of insulated blocks, numbers 12.

The electric steaming stand functions when connected to a source of alternating current and water is poured into the vessel. Part of the electrolyte dissolves and provides a conducting medium for the passage of current between the electrodes. The resistance of the solution causes it to heat and generate steam.

Water is poured into the vessel through a funnel rather than through the perforated top because this top is normally covered. In the case of the ironing board, it is covered with a soft pad and cover.

I claim:

1. An electric steaming stand comprising an ironing board or other stand having a perforated or porous top to permit passage of steam, a vessel opening onto and affixed to the underside of said top, and a tube or pipe passing through a wall of the vessel and connected to a water feed, said vessel containing and being electrically insulated from an electrolyte and a pair of spaced electrodes, with means for connecting the electrodes to a source of alternating current.

2. An electric steaming stand comprising an ironing board or other stand having a perforated or porous top to permit passage of steam, a vessel opening onto and affixed to the underside of said top, and a tube or pipe passing through a wall of the vessel and connected to a water feed, said vessel containing and being electrically insulated from a pair of closely spaced electrodes, with means for connecting the electrodes to a source of alternating current.

LLOYD I. OSIPOW.

REFERENCES CITED

The following references are of record in the file of this patent:

UNITED STATES PATENTS

| Number | Name | Date |
| --- | --- | --- |
| 1,299,649 | Young et al. | Apr. 8, 1919 |
| 1,429,865 | Friedman | Sept. 19, 1922 |
| 1,862,071 | Vickery | June 7, 1932 |
| 2,011,748 | Boyd | Aug. 20, 1935 |
| 2,035,959 | Hamm | Mar. 31, 1936 |
| 2,423,945 | Osipow et al. | July 15, 1947 |